(12) United States Patent
Noris et al.

(10) Patent No.: US 11,436,790 B2
(45) Date of Patent: Sep. 6, 2022

(54) PASSTHROUGH VISUALIZATION

(71) Applicant: Meta Platforms Technologies, LLC, Menlo Park, CA (US)

(72) Inventors: Gioacchino Noris, Zurich (CH); James Allan Booth, Redwood City, CA (US); Alexander Sorkine Hornung, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/091,254

(22) Filed: Nov. 6, 2020

(65) Prior Publication Data

US 2021/0082176 A1    Mar. 18, 2021

Related U.S. Application Data

(63) Continuation of application No. 16/213,789, filed on Dec. 7, 2018, now Pat. No. 10,861,223.

(60) Provisional application No. 62/756,440, filed on Nov. 6, 2018.

(51) Int. Cl.
*G06T 19/20* (2011.01)
*G06T 15/20* (2011.01)
*G06T 7/246* (2017.01)

(52) U.S. Cl.
CPC ............ *G06T 15/205* (2013.01); *G06T 7/248* (2017.01); *G06T 19/20* (2013.01)

(58) Field of Classification Search
CPC ........ G06T 15/205; G06T 7/248; G06T 19/20
USPC .......................................................... 345/420
See application file for complete search history.

(56) References Cited

U.S. PATENT DOCUMENTS

| | | | | |
|---|---|---|---|---|
| 2013/0083063 | A1* | 4/2013 | Geisner | G06F 3/013 345/633 |
| 2014/0147014 | A1* | 5/2014 | Mallet | G06T 7/251 382/107 |
| 2017/0243324 | A1* | 8/2017 | Mierle | G06T 11/60 |
| 2017/0309071 | A1* | 10/2017 | Benko | G06F 3/017 |
| 2019/0087011 | A1* | 3/2019 | Kim | G06F 3/017 |
| 2019/0391724 | A1* | 12/2019 | Holz | G06F 1/163 |

\* cited by examiner

*Primary Examiner* — Jin Ge
(74) *Attorney, Agent, or Firm* — Baker Botts L.L.P.

(57) ABSTRACT

In one embodiment, a method includes receiving image data corresponding to an external environment of a user. The image data is captured at a first time and comprises a body part of the user. The method also includes receiving a first tracking data generated based on measurements made at the first time by at least one motion sensor associated with the body part; generating, based at least on the image data, a model representation associated with the body part; receiving a second tracking data generated based on measurements made at a second time by the at least one motion sensor associated with the body part; determining a deformation of the model representation associated with the body part based on the first tracking data and the second tracking data; and displaying the deformation of the model representation associated with the body part of the user.

20 Claims, 7 Drawing Sheets

PASSTHROUGH VISUALIZATION

PRIORITY

This application is a continuation under 35 U.S.C. § 120 of U.S. patent application Ser. No. 16/213,789, filed 7 Dec. 2018, which claims the benefit, under 35 U.S.C. § 119(e), of U.S. Provisional Patent Application No. 62/756,440, filed 6 Nov. 2018, each of which is incorporated herein by reference.

TECHNICAL FIELD

This disclosure generally relates to rendering a virtual environment.

BACKGROUND

Artificial reality is a form of reality that has been adjusted in some manner prior presentation to a user. Artificial reality may include, e.g., virtual reality (VR), augmented reality (AR), mixed reality (MR), hybrid reality, or some combination and/or derivatives thereof. Artificial-reality content may include completely generated content or generated content combined with captured content (e.g., real-world photographs). In particular embodiments, the user may interact with a virtual object in a manner that is similar to the way a user interacts with physical objects within the user environment. In order to create a perception of an altered user environment, artificial reality systems may use a combination of visual, audio, and tactile effects. Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

A controller of an artificial reality system may include a number of sensors, such as for example a gyroscope, accelerometer, magnetometer, or any combination thereof. An artificial-reality headset may include one or more cameras to capture the virtual environment seen by the user wearing the artificial-reality headset. In particular embodiments, images captured by the cameras may be used to render an artificial version of the external environment. Rendering the external environment even at a basic level may introduce image-processing latency that makes it difficult for the rendering to visually capture the movements of the user's body (e.g., hands or wrist) in real-time. As such, the virtual environment displayed to the user may use information that occurred prior to the present time. While the latency may not be perceptible with respect to a static virtual environment, the latency may be perceptible with respect to the user's own body movements since there is an expectation of immediate, real-time visual feedback when person moves.

As described above, the environment around the user may be captured by outward-facing cameras of an artificial-reality headset. In particular embodiments, the captured images may be used to reconstruct the external environment in three dimensions (3-D). In particular embodiments, an algorithm may extract visual cues (e.g., lines or sharp corners) from the captured images and convert the extracted lines into a 3-D rendering, resulting in a sparse depth reconstruction. Image content may be passed through and overlaid onto a stylized or photorealistic virtual environment that is displayed on the artificial-reality headset.

As described below, a portion of the passthrough visual information associated with the external environment—in particular a portion of the pass-through visual information corresponding to the user's body, such as the hands and wrist—may be synchronized to the current position/orientation of body as measured by, for example, hand-held controllers. In particular embodiments, the rendering of the virtual environment proximate to the controller may be deformed based on the real-time tracking of the controller, which can be obtained using the controller's sensors. As example and not by way of limitation, the virtual environment may be generated using image content captured at a previous time due to the image-processing latency, but the portion of the virtual environment corresponding to the delayed position of the user's hand and controller may be deformed to a position that matches the real-time position of the controller. This deformation may lead to an elimination of the perceived latency in the motion associated with a user. In particular embodiments, an amount of deformation of the area proximate to the controller may be inferred based on determining a deformation vector based on the position/orientation of the controller when the images were captured and the current (real-time) position/orientation of the controller. In particular embodiments, vertices of the triangular mesh may be tied to the pass-through visual environment and the perceived displacement of the pass-through virtual environment observed by the movement of these vertices.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
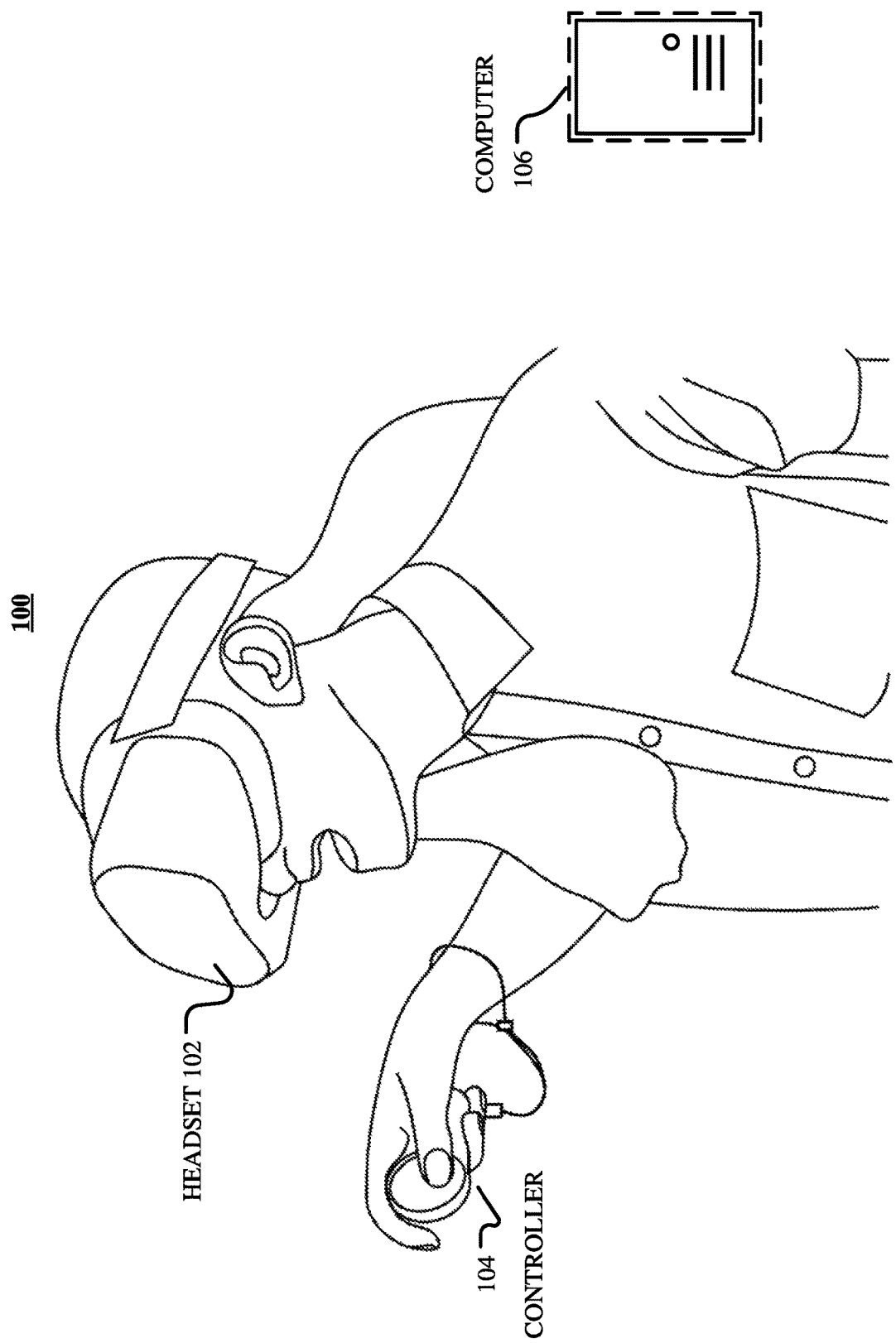
FIG. 1 illustrates an example VR system.

A controller of an artificial reality system may include a number of sensors, such as for example a gyroscope, accelerometer, magnetometer, or any combination thereof. An artificial-reality headset may include one or more cameras to capture the virtual environment seen by the user wearing the artificial-reality headset. In particular embodiments, images captured by the cameras may be used to render an artificial version of the external environment.

As described above, there is a latency between the time the cameras of the headset capture an image, and the time artificial-reality system displays the corresponding images. Rendering the external environment even at a basic level may introduce image-processing latency (e.g., 40 milliseconds) that makes it difficult for the rendering to visually capture the movements of the user's body (e.g., hands or wrist) in real-time. As such, the virtual environment displayed to the user may use information that occurred prior to the present time (e.g., 40 milliseconds earlier). While the latency may not be perceptible with respect to a static virtual environment, the latency may be perceptible with respect to the user's own body movements since there is an expectation of immediate, real-time visual feedback when person moves. Even if the current position of the controller is tracked based only using image-based tracking, the latency is usually much lower (e.g., approximately 1 frame latency) compared to a full image-based 3-D reconstruction pipeline (e.g., multiple frames). If the controller makes use of (e.g, inertial measurement unit (IMU)), the latency is reduced even further (e.g., IMUs sampling frequency in kilohertz).

As described above, the environment around the user may be captured by outward-facing cameras of an artificial-reality headset. In particular embodiments, the captured images may be used to reconstruct the external environment in three dimensions (3-D). In particular embodiments, an algorithm may extract visual cues (e.g., lines or sharp corners) from the captured images and convert the extracted lines into a 3-D rendering, resulting in a sparse depth reconstruction. Image content may be passed through and overlaid onto a stylized or photorealistic virtual environment that is displayed on the artificial-reality headset.

As described below, a portion of the pass-through visual information associated with the external environment—in particular a portion of the pass-through visual information corresponding to the user's body, such as the hands and wrist—may be synchronized to the current position/orientation of body as measured by, for example, hand-held controllers. In particular embodiments, the rendering of the virtual environment proximate to the controller may be deformed based on the real-time tracking of the controller, which can be obtained using the controller's sensors. As example and not by way of limitation, the virtual environment may be generated using image content captured at a previous time due to the image-processing latency, but the portion of the virtual environment corresponding to the delayed position of the user's hand and controller may be deformed to a position that matches the real-time position of the controller. This deformation may lead to an elimination of the perceived latency in the motion associated with a user.

In particular embodiments, an amount of deformation of the area proximate to the controller may be inferred based on determining a deformation vector based on the position/orientation of the controller when the images were captured and the current (real-time) position/orientation of the controller. In particular embodiments, for a stylized or ling-based rendering, vertices of a triangular mesh may be tied to the pass-through visual environment and the perceived displacement of the pass-through virtual environment observed by the movement of these vertices, as described below. In particular embodiments, for a photorealistic rendering, a 3-D geometric proxy (e.g., a mesh) may be computed using the image data captured using the cameras of the artificial-reality headset. The 3-D geometric proxy may be textured using the image data. As an example and not by way of limitation, this texturing may be photorealistic (e.g., unprocessed image data) or stylized (e.g., lines, cartoon style, any kind of image filter). The textured mesh may be distorted/updated with the current position of the controller.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates an example artificial-reality system. In particular embodiments, artificial-reality system 100 may include a headset 102 (e.g., HMD), one or more controllers 104, and a computing system 106. Herein, the terms "headset" and "head-mounted display" may be used interchangeably to refer to a head-mounted device for artificial-reality system 100. A user may wear headset 102 that is configured to display VR or AR content to the user on one or more display components of headset 102. The display components may be stereoscopic output devices configured to output stereoscopic images to the user. Headset 102 may include a processor to process data from computing system 106 or controller 104. In addition, headset 102 may include outward-facing stereoscopic cameras configured to capture images and videos of the external environment. These images may represent a real-world scene viewed from slightly different perspectives that enable the user to perceive a three-dimensional (3-D) virtual environment.

Computing system 106 of artificial-reality system 100 may be a standalone host computer system, a mobile device, or any other hardware platform capable of providing artificial-reality content to and receiving input from the user. In particular embodiments, computing system 106 may execute an application with modules that include a preprocessor, a feature identifier, a geometry modeler, and a depth estimator, as described below. Each of these modules may represent a different stage in a processing pipeline that is configured to generate a virtual environment. In operation, the preprocessor may receive left side and right-side images captured stereoscopically by the outward-facing cameras of headset 102, described above, and these images may be preprocessed to increase contrast. The preprocessed images may be analyzed by the feature identifier to identify one or more features, and the geometry modeler may generate, based on the identified features, feature geometry representing the external environment. In particular embodiments, the depth estimator may interpolate and/or extrapolate the depth information to enhance the feature geometry and generate a geometric reconstruction. In particular embodiments, a geometry projector renders stereoscopic images based on the geometric reconstruction. The rendered stereoscopic images form at least part of the virtual environment displayed to the user on the display components of headset 102.

In particular embodiments, controller 104 may be wirelessly connected (e.g., WI-FI or BLUETOOTH) to headset 102. In particular embodiments, controller 104 may receive input from the user and relay the input to computing system 106 through headset 102. Controller 104 may also include one or more types of motion sensors to track movements that may be part of the input from the user. As an example and not by way of limitation, controller 104 may include a gyroscope, accelerometer, magnetometer, or any combination thereof. A gyroscope is a motion sensor that is configured to measure angular velocity along three axes (e.g., pitch, roll, and yaw). An accelerometer is a motion sensor that is configured to measure acceleration and gravity, and the magnetometer is a sensor that is configured to measure the magnetic field in 3-D around the proximity of controller 104. The processor of headset 102 may receive and use data from the sensors of controller 104 to determine the position or orientation of controller 104.

Figure 2:
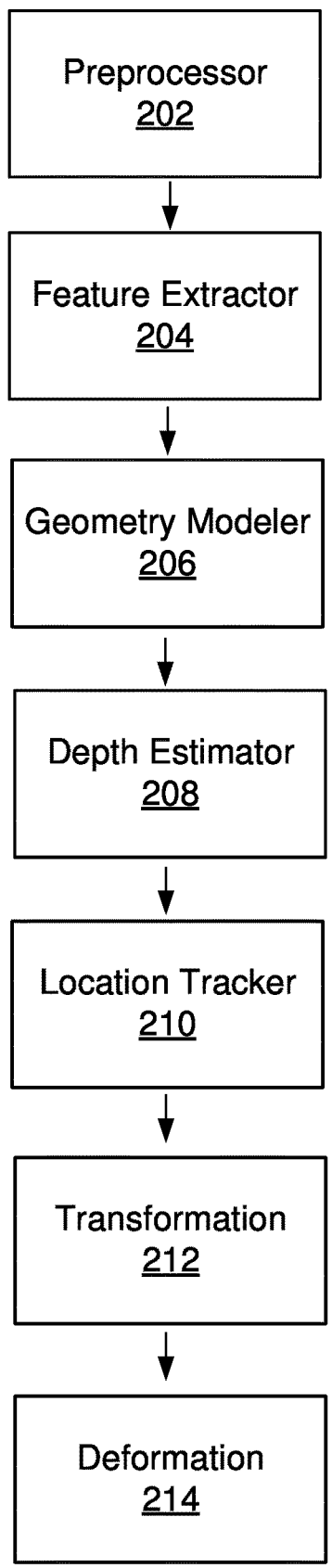
FIG. 2 illustrates example modules for rendering a virtual environment.

FIG. 2 illustrates example modules for rendering a virtual environment. As described above, the visualization modules may include a preprocessor module 202 that preprocesses the stereoscopic images to maximize contrast. A feature extractor 204 may receive the preprocessed images and extracts a set of features from those images, including lines, edges, or corners. In particular embodiments, feature extractor 204 may implement one or more computer vision techniques to analyze left side and right-side images to detect any suitable visual cue or visual reference that user may recognize for the purposes of localization and/or orientation. As an example and not by way of limitation, feature extractor 204 may implement a Canny edge detection algorithm to identify specific groups of pixels that belong to specific edges. Feature extractor 204 may tag pixels or groups of pixels within preprocessed images with specific classifications and then provide the tagged, preprocessed images to geometry modeler 206.

For each feature, geometry modeler 206 may generate one or more two-dimensional (2-D) polylines. Geometry modeler 206 may overlay a line segment across a given edge detected by feature extractor 204 and generate a set of vertices defining that line segment. In particular embodiments, geometry modeler 206 may triangulate between 2-D polylines found in right-side images of the stereoscopic images and corresponding 2-D polylines found in left-side images to generate a set of 3-D polylines. As an example and not by way of limitation, geometry modeler 206 may triangulate between matched 2-D polylines in order to infer depth information for each vertex of those polylines, thereby generating 3-D polylines. Each 3-D polyline may include a set of 3-D vertices. In particular embodiments, the generated 3-D polylines form the basis for a geometric reconstruction of the external environment and may be processed further via depth estimator 208.

In particular embodiments, a depth estimator 208 may generate a triangular mesh for approximating additional 3-D vertices. The triangular mesh may traverse between 3-D polylines and form a surface that approximates the geometry of external environment. The triangular mesh includes a set of triangles that are connected by their common edges or corners.

A locator tracker module 210 may be configured to track the position of locators in the external environment. As described below, for one or more of the preprocessed images, a set of locators corresponding to one or more body parts of interest (e.g., hand and wrist) and the position/orientation of each locator relative to the position of the low-latency-tracked objects (e.g., controller) may be defined. As described below, locator tracker module 210 may be configured to track the position and orientation of the defined locators in real-time based on the tracking in real-time the position and orientation of the controller held by the user.

A transformation module 212 may be configured to determine the location of the set of locators at a time t. In particular embodiments, transformation module 212 is configured to compute the position and orientation of a locator based on the position and orientation of the low-latency-tracked objects (e.g., controller) at a given time t. Transformation module 212 may track the controller over time. In particular embodiments, transformation module 212 may compute, store the position and orientation of the locators in a data store as function time t, and query the data store for later use.

A deformation module 214 may be configured to deform the virtual environment in an area corresponding to the body part of the user to a position and orientation based on the respective locator at a current time. In particular embodiments, deformation module 214 may modify one or more vertices of the triangular mesh described above to a position and orientation that corresponds to a current time. As an example and not by way of limitation, deformation module 214 may modify one or more vertices of the triangular mesh based on calculating a displacement vector that is difference between the location of the locators at a current time and the location of the locators at a previous time $t_1$.

Figure 3:
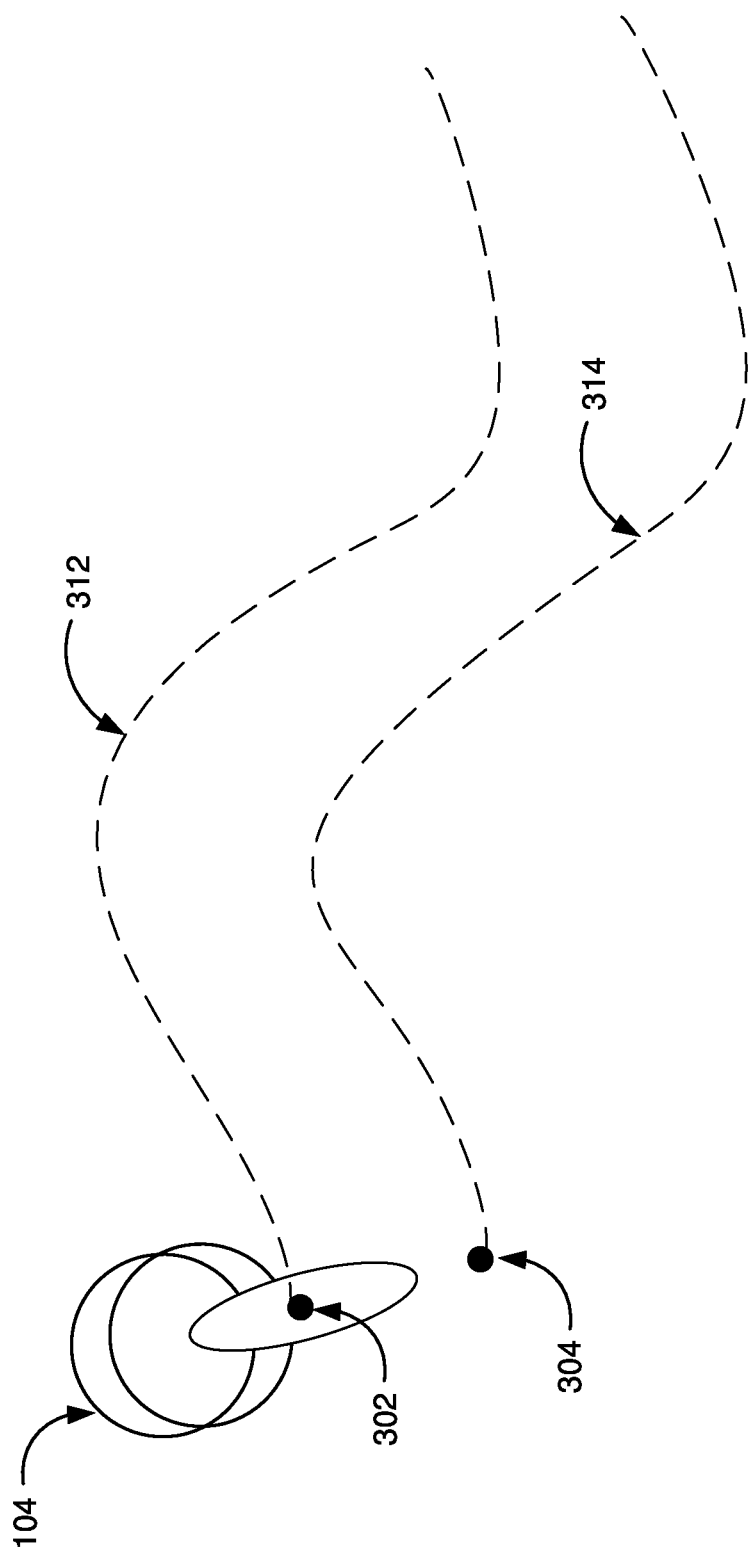
FIG. 3 illustrates example locator tracking.

FIG. 3 illustrates example locator tracking. In particular embodiments, the position or orientation of a body part of the user may be tracked in real-time by utilizing low-latency-tracked objects. As described above, controller 104 of an artificial-reality system may be tracked in real-time. As an example and not by way of limitation, the sensors of controller 104 held by a user may be a low-latency-tracked object. Controller 104 may be tracked with six degrees of freedom (DoFs) corresponding to its position in 3-D and orientation (e.g., pitch, roll, and yaw)). In particular embodiments, a set of locators corresponding to one or more body parts of interest (e.g., hand 302 and wrist 304) and the position/orientation of each locator 302 and 304 relative to the position of the low-latency-tracked objects (e.g., controller 104) may be defined. As an example and not by way of limitation, locator 304 corresponding to a wrist may be defined at a pre-determined distance (e.g., average hand size) from locator 302 corresponding to a hand. In particular embodiments, a location 312 of locator 302 and a location 314 of locator 304 may be tracked as a function of time based on the location of controller 104. Furthermore, other body parts (e.g., elbow or shoulder), headset position, or other dynamic elements in the external environment (e.g., other people/objects) may be tracked in the similar fashion. Although this disclosure describes and illustrates tracking the position of locators using particular low latency-tracked objects, this disclosure contemplates tracking the position of locators using any suitable methods or objects, such as for example, fast image-based object trackers, augmented reality targets/markers (e.g., QR codes), or inverse kinematics in combination with controllers or headset position.

Figure 4:
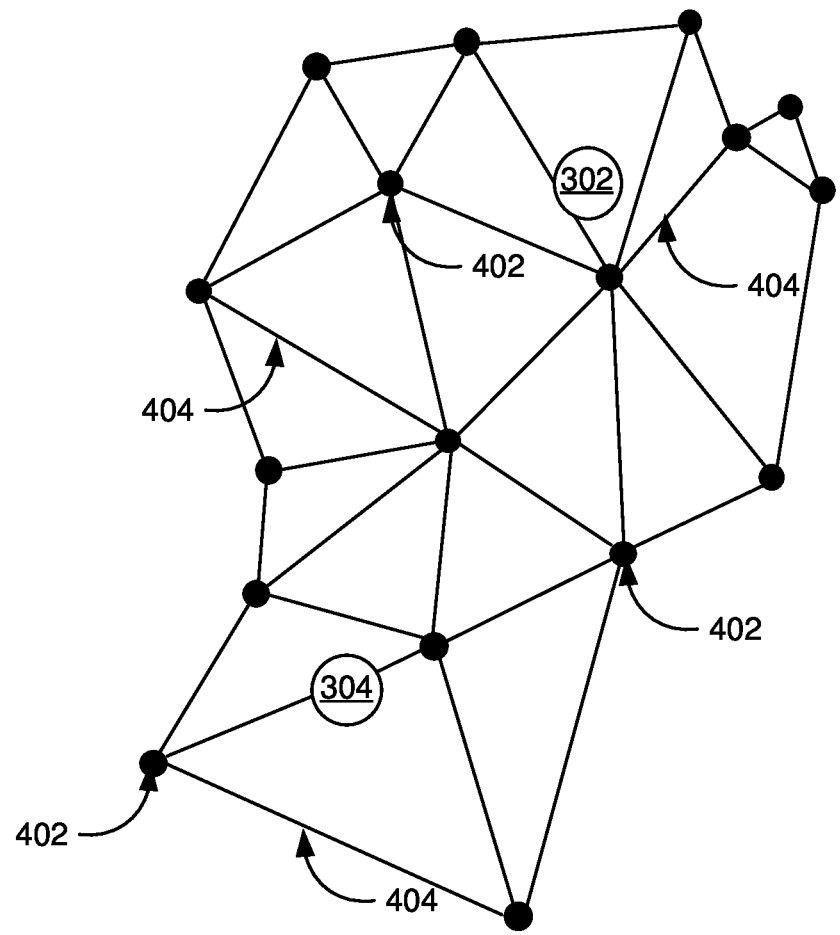
FIG. 4 illustrates an example triangular mesh.

FIG. 4 illustrates an example triangular mesh. In particular embodiments, the triangular mesh from the depth estimator module may include hand locator 302, wrist locator 304, a number of vertices 402, and polylines 404 forming the triangular mesh by connecting pairs of vertices 402. The triangular mesh includes a set of triangles that are connected by their common edges or corners. As described above, the triangular mesh forms a surface that approximates a geometry of external environment (e.g., region around a hand and wrist of the user). As described below, the geometry of the external environment may be deformed by modifying the position or orientation of one or more vertices 402 associated with one or more locators (e.g., 302 or 304). Although this disclosure describes and illustrates tracking the position of locators using particular low latency-tracked objects, this disclosure contemplates tracking the position of locators using any suitable methods or objects, such as for example, fast image-based object trackers, augmented reality targets/ markers (e.g., QR codes), or inverse kinematics in combination with controllers or headset position.

Figure 5:
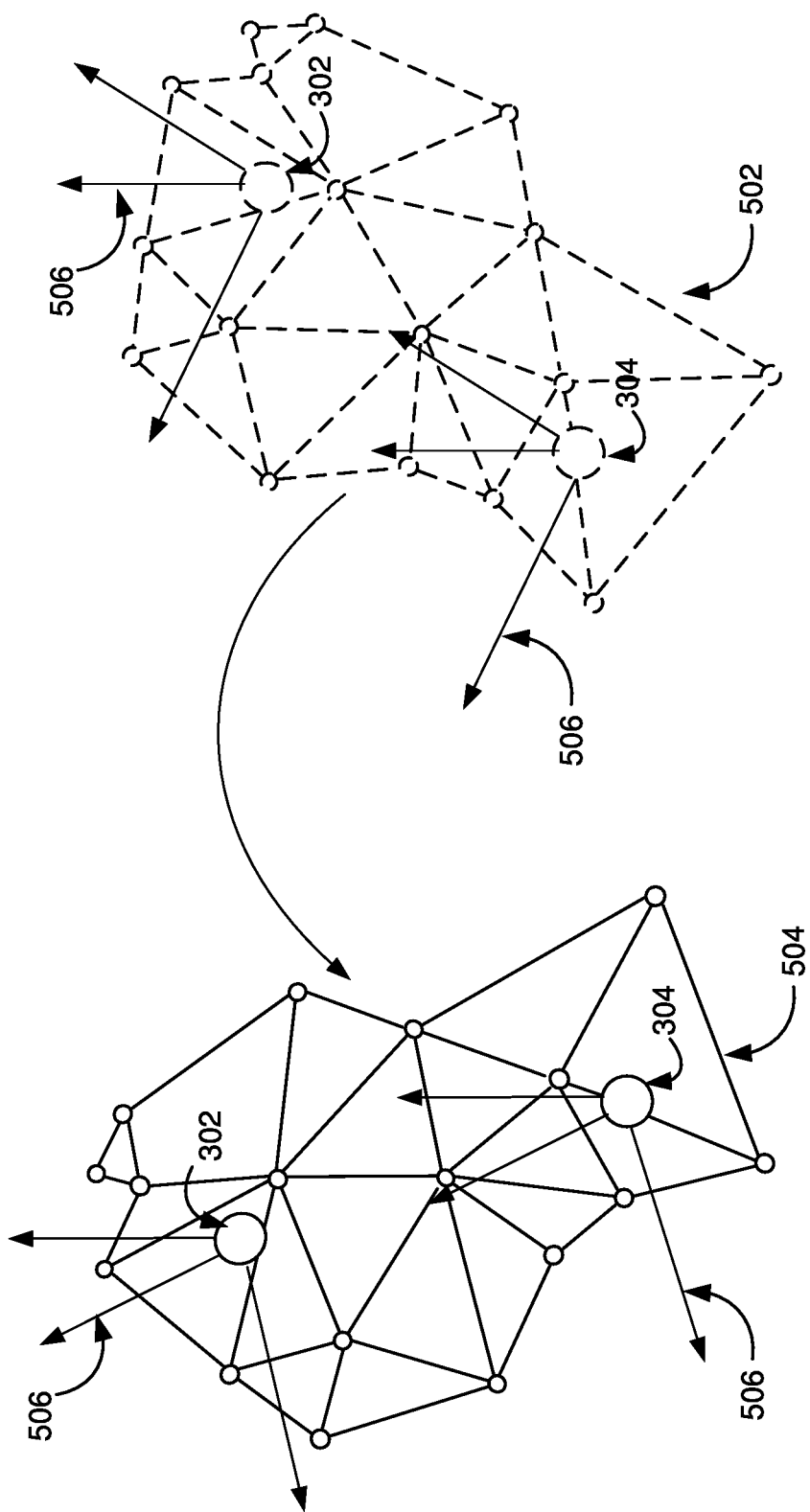
FIG. 5 illustrates an example deformation of a triangular mesh.

FIG. 5 illustrates an example deformation of a triangular mesh. The image-processing amount of latency may be characterized experimentally, and by understanding how the latency fluctuates, the external environment corresponding to the body part may be modeled accordingly. In particular embodiments, the position and orientation of the locators is known, through tracking of the controller and the transformation module, at any given time t. The deformation module may query the transformation module for stored position and orientation of the locators at any previous time $t_1$. To render the portion of the external environment corresponding to the body part at the current time t, the deformation module may determine the previous time $t_1$ corresponding to the time of the images being displayed to the user due to image-processing latency. The previous time $t_1$ is related by the current time t by equation (1):

$$t_1 = t - t_{latency} \qquad (1)$$

where $t_1$ corresponds to the previous time when the images were captured, t is the current time, and $t_{latency}$ corresponds to the amount of image-processing latency (e.g., in seconds). In particular embodiments, the deformation module may calculate a displacement vector 506 that is based on the position and orientation of the locators at the current time t and position and orientation of the locators at previous time $t_1$ As described above, the deformation module may calculate a transformation function that modifies a triangular mesh 502 corresponding to the previous time $t_1$ to determine a triangular mesh 504 corresponding to the external environment with the position of the body part at current time t. In particular embodiments, the deformation module may calculate the influence or weight that each locator 302 and 304 has on a vertex of the triangular mesh at previous time $t_1$. As an example and not by way of limitation, a vertex closer to locators 302 and 304 may have a larger displacement than a vertex that is farther from locators 302 and 304. In particular embodiments, a transformation function that is applied to each vertex may be a linear combination of the displacement vector 506 according to the weights. In particular embodiments, the vertices of triangular mesh 502 and 504 are tied to the corresponding portion of the render external environment and that by moving these vertices (either in 3D or 2D), displacement of the portion of the external environment may be perceived by the user. As an example and not by way of limitation, by aligning the position and orientation of the locators with the portion of the external environment, locators 302 and 304 may align with the portion of the external environment corresponding to the hand and wrist, respectively. Although this disclosure describes and illustrates modifying the triangular mesh corresponding to particular body parts, this disclosure contemplates modifying the triangular mesh corresponding to any suitable body parts, such as for example, an elbow or leg.

Figure 6:
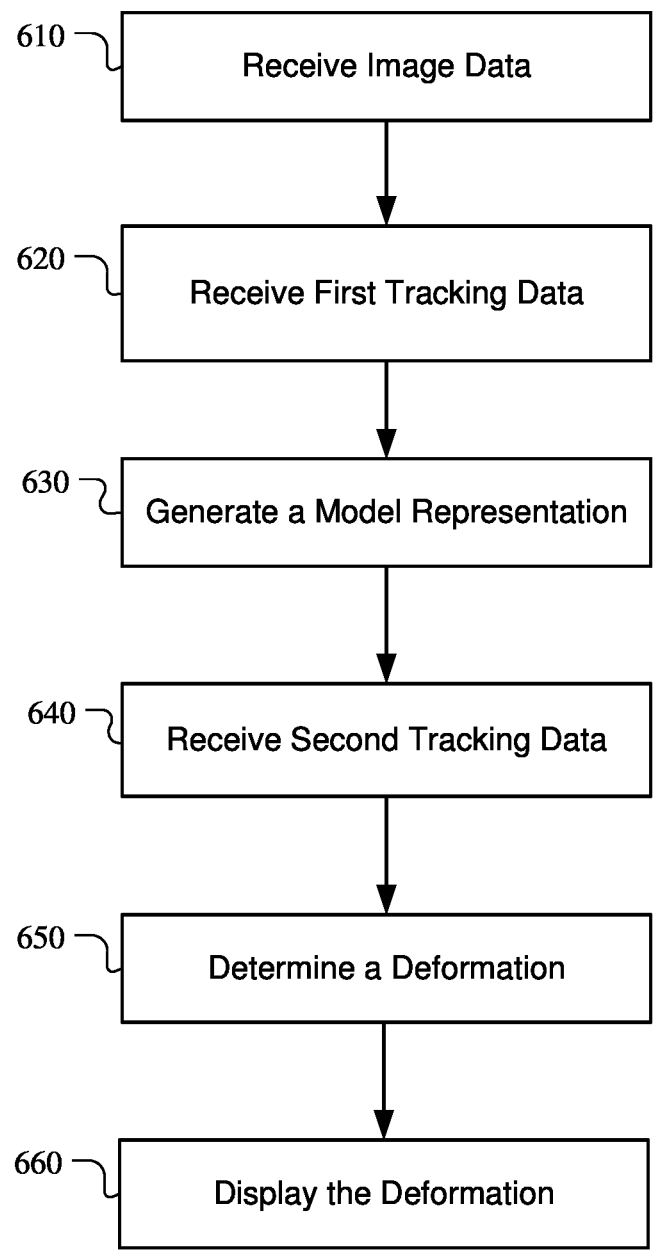
FIG. 6 illustrates an example method for latency compensation when rendering a virtual environment.

FIG. 6 illustrates an example method for latency compensation when rendering a virtual environment. The method 600 may begin at step 610, where a computing device may receive image data corresponding to an external environment of a user. In particular embodiments, the image data is captured at a first time by one or more outward-facing cameras of a headset and includes a body part of the user. At step 620, the computing device may receive a first tracking data generated based on measurements made at the first time by at least one motion sensor associated with the body part. At step 630, the computing device may generate, based at least on the image data, a model representation associated with the body part. In particular embodiments, the model representation may be associated with the hand and wrist of the user. At step 640, the computing device may receive a second tracking data generated based on measurements made at a second time by the at least one motion sensor associated with the body part. In particular embodiments, the second time may be the current time t. At step 650, the computing device may determine a deformation of the model representation associated with the body part based on the first tracking data and the second tracking data. In particular, the deformation may be a transformation function that is based on the position of the controller at the first time (previous time $t_1$) and the position of the controller at the second time (current time t). As an example and not by way of limitation, the transformation function may be a function that is proportional to a distance of each respective vertex from a nearest locator. At step 660, the computing device may display the deformation of the model representation associated with the body part of the user. In particular embodiments, the model representation may be displayed to the user through a display component of the headset.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for latency compensation when rendering a virtual environment including the particular steps of the method of FIG. 6, this disclosure contemplates any suitable method for latency compensation when rendering a virtual environment including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
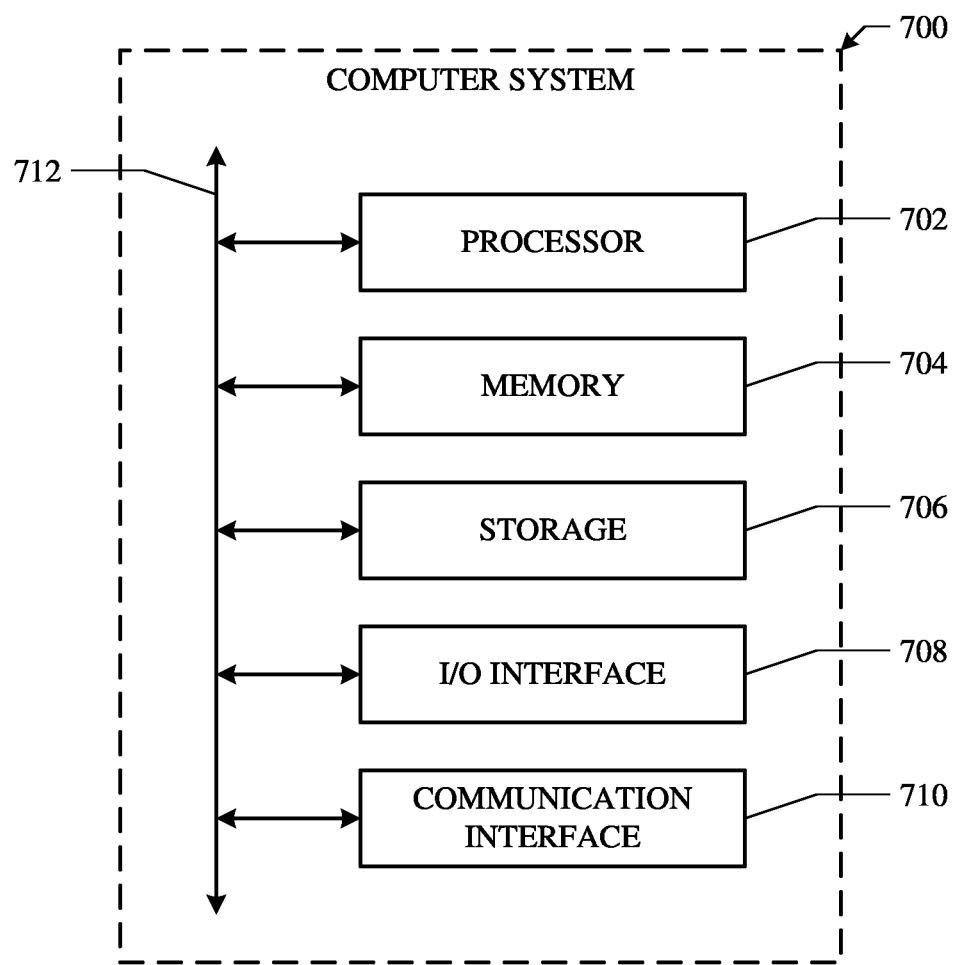
FIG. 7 illustrates an example computer system.

FIG. 7 illustrates an example computer system. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these.

Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing device:
receiving image data captured at a previous time by one or more cameras of a first artificial-reality headset worn by a first user, the image data corresponding to an external environment of the first user, wherein the image data comprises a body part of the first user;
generating an artificial-reality environment corresponding to the external environment of the first user based on the image data;
receiving tracking data generated based on measurements made at a current time by at least one motion sensor of the first artificial-reality headset worn by the first user and coupled to the body part of the first user; and
displaying, via the first artificial-reality headset, a modified artificial-reality environment comprising: (1) a first portion corresponding to the external environment of the first user that is rendered based on the image data captured, by the one or more cameras of the first artificial-reality headset worn by the first user, at the previous time prior to the current time and (2) a second portion corresponding to the body part of the first user that is rendered in real time based on the movement of the body part as measured, by the at least one motion sensor of the first artificial-reality headset worn by the first user and coupled to the body part of the first user, at the current time;
wherein the first portion, corresponding to the external environment of the first user, associated with the previous time and the second portion, corresponding to the body part of the first user, associated with the current time are rendered based on data captured or measured for both portions by the first artificial-reality headset worn by the first user and are simultaneously displayed via the first artificial-reality headset; and
wherein simultaneously displaying the first portion, corresponding to the external environment of the first user, associated with the previous time and the second portion, corresponding to the body part of the first user, associated with the current time eliminates or reduces image-processing latency.

2. The method of claim 1, further comprising:
generating, based at least on the image data, a model representation associated with the body part, the model representation comprising a plurality of vertices; and
determining a deformation of the model representation associated with the body part by modifying one or more vertices of the plurality of vertices based on the image data captured at the previous time and the tracking data captured at the current time;
wherein displaying the modified artificial-reality environment is based on the deformation of the model representation.

3. The method of claim 2, wherein an amount of modification to the modified vertices is proportional to a distance of each respective vertex from a nearest locator corresponding to one or more points of interest of the body part.

4. The method of claim 3, wherein the tracking data comprises position and orientation information associated with the nearest locator.

5. The method of claim 2, wherein determining the deformation comprises:
calculating a transformation function based on the image data captured at the previous time and the tracking data captured at the current time; and
applying the transformation function to the model representation associated with the body part.

6. The method of claim 5, wherein modifying the one or more vertices of the plurality of vertices is based on the transformation function.

7. The method of claim 1, wherein the previous time and the current time are separated by a pre-determined amount of time.

8. The method of claim 1, wherein the image-processing latency is associated with a motion of the first user.

9. The method of claim 1, wherein the at least one motion sensor comprises a controller of the first artificial-reality headset.

10. The method of claim 1, wherein the at least one motion sensor is connected to the first artificial-reality headset through a wireless connection.

11. The method of claim 1, wherein the body part comprises a hand, a wrist, an elbow, or a leg.

12. The method of claim 1, wherein the artificial-reality environment comprises a virtual-reality environment.

13. One or more computer-readable non-transitory storage media embodying software that is operable when executed to:
receive image data captured at a previous time by one or more cameras of a first artificial-reality headset worn by a first user, the image data corresponding to an external environment of the first user, wherein the image data comprises a body part of the first user;
generate an artificial-reality environment corresponding to the external environment of the first user based on the image data;
receive tracking data generated based on measurements made at a current time by at least one motion sensor of the first artificial-reality headset worn by the first user and coupled to the body part of the first user; and
display, via the first artificial-reality headset, a modified artificial-reality environment comprising: (1) a first portion corresponding to the external environment of the first user that is rendered based on the image data captured, by the one or more cameras of the first artificial-reality headset worn by the first user, at the previous time prior to the current time and (2) a second portion corresponding to the body part of the first user that is rendered in real time based on the movement of the body part as measured, by the at least one motion sensor of the first artificial-reality headset worn by the first user and coupled to the body part of the first user, at the current time;
wherein the first portion, corresponding to the external environment of the first user, associated with the previous time and the second portion, corresponding to the body part of the first user, associated with the current time are rendered based on data captured or measured for both portions by the first artificial-reality headset worn by the first user and are simultaneously displayed via the first artificial-reality headset; and
wherein simultaneously displaying the first portion, corresponding to the external environment of the first user, associated with the previous time and the second portion, corresponding to the body part of the first user, associated with the current time eliminates or reduces image-processing latency.

14. The media of claim 13, wherein the software is further operable to:

generate, based at least on the image data, a model representation associated with the body part, the model representation comprising a plurality of vertices; and determine a deformation of the model representation associated with the body part by modifying one or more vertices of the plurality of vertices based on the image data captured at the previous time and the tracking data captured at the current time;

wherein displaying the modified artificial-reality environment is based on the deformation of the model representation.

15. The media of claim 14, wherein an amount of modification to the modified vertices is proportional to a distance of each respective vertex from a nearest locator corresponding to one or more points of interest of the body part.

16. The media of claim 15, wherein the tracking data comprises position and orientation information associated with the nearest locator.

17. A system comprising:

one or more processors; and a memory coupled to the processors comprising instructions executable by the processors, the processors being operable when executing the instructions to:

receive image data captured at a previous time by one or more cameras of a first artificial-reality headset worn by a first user, the image data corresponding to an external environment of the first user, wherein the image data comprises a body part of the first user;

generate an artificial-reality environment corresponding to the external environment of the first user based on the image data;

receive tracking data generated based on measurements made at a current time by at least one motion sensor of the first artificial-reality headset worn by the first user and coupled to the body part of the first user; and display, via the first artificial-reality headset, a modified artificial-reality environment comprising: (1) a first portion corresponding to the external environment of the first user that is rendered based on the image data captured, by the one or more cameras of the first artificial-reality headset worn by the first user, at the previous time prior to the current time and (2) a second portion corresponding to the body part of the first user that is rendered in real time based on the movement of the body part as measured, by the at least one motion sensor of the first artificial-reality headset worn by the first user and coupled to the body part of the first user, at the current time;

wherein the first portion, corresponding to the external environment of the first user, associated with the previous time and the second portion, corresponding to the body part of the first user, associated with the current time are rendered based on data captured or measured for both portions by the first artificial-reality headset worn by the first user and are simultaneously displayed via the first artificial-reality headset; and wherein simultaneously displaying the first portion, corresponding to the external environment of the first user, associated with the previous time and the second portion, corresponding to the body part of the first user, associated with the current time eliminates or reduces image-processing latency.

18. The system of claim 17, wherein the processors are further operable to:

generate, based at least on the image data, a model representation associated with the body part, the model representation comprising a plurality of vertices; and determine a deformation of the model representation associated with the body part by modifying one or more vertices of the plurality of vertices based on the image data captured at the previous time and the tracking data captured at the current time;

wherein displaying the modified artificial-reality environment is based on the deformation of the model representation.

19. The system of claim 18, wherein an amount of modification to the modified vertices is proportional to a distance of each respective vertex from a nearest locator corresponding to one or more points of interest of the body part.

20. The system of claim 19, wherein the tracking data comprises position and orientation information associated with the nearest locator.

* * * * *